US012367084B2

(12) United States Patent
Xie et al.

(10) Patent No.: US 12,367,084 B2
(45) Date of Patent: Jul. 22, 2025

(54) METHOD FOR OBTAINING BROWSER RUNNING DATA, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yu Xie, Beijing (CN); Yuanmei Hou, Beijing (CN); Yong Wang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 391 days.

(21) Appl. No.: 18/049,721

(22) Filed: Oct. 26, 2022

(65) Prior Publication Data
US 2023/0065492 A1   Mar. 2, 2023

(30) Foreign Application Priority Data
Oct. 26, 2021   (CN) .......................... 202111248539.5

(51) Int. Cl.
*G06F 9/54* (2006.01)
*G06F 11/34* (2006.01)

(52) U.S. Cl.
CPC .......... *G06F 9/542* (2013.01); *G06F 11/3495* (2013.01)

(58) Field of Classification Search
None
See application file for complete search history.

(56) References Cited

U.S. PATENT DOCUMENTS

| 6,611,877 B2 | 8/2003 | Kom et al. |
| 2005/0198649 A1 | 9/2005 | Zakonov |
| 2006/0271827 A1 | 11/2006 | Cascaval et al. |
| 2007/0083649 A1 | 4/2007 | Zuzga et al. |
| 2009/0249300 A1 | 10/2009 | Vainer et al. |
| 2019/0087303 A1* | 3/2019 | Min ...................... G06F 9/542 |
| 2022/0374265 A1* | 11/2022 | Davis ................ G06F 11/0757 |

FOREIGN PATENT DOCUMENTS

| CN | 112346944 A | 2/2021 |
| WO | 2007048726 A1 | 5/2007 |

OTHER PUBLICATIONS

Extended European Search Report issued in European Application No. 22203836.6, mailed on Mar. 6, 2023 (13 pages).
Office Action issued in corresponding CN Application No. 202111248539.5 with English translation dated Mar. 28, 2025 (12 pages).

* cited by examiner

*Primary Examiner* — Craig C Dorais
(74) *Attorney, Agent, or Firm* — Osha Bergman Watanabe & Burton LLP (57) ABSTRACT

A method for obtaining browser running data, includes: receiving a trigger request of event, in which the trigger request includes an event to be executed and a first time point corresponding to the trigger request; in a case that the event to be executed is bound with a callback function, binding the event to be executed with a preset event monitoring function; obtaining a second time point for executing the event monitoring function; and determining a response duration of a browser under the event to be executed based on a time interval between the second time point and the first time point.

20 Claims, 4 Drawing Sheets

METHOD FOR OBTAINING BROWSER RUNNING DATA, ELECTRONIC DEVICE, AND STORAGE MEDIUM

CROSS-REFERENCE TO RELATED APPLICATION

This application claims the benefit of priority to Chinese Application No. 202111248539.5, filed on Oct. 26, 2021, the contents of which are incorporated herein by reference in their entirety.

TECHNICAL FIELD

The present disclosure relates to the field of data processing technology, especially the fields of big data, information stream and cloud service, in particular to a method for obtaining browser running data, an electronic device, and a storage medium.

BACKGROUND

With the development of computer technology and Internet technology, people have higher requirements for the performance of Internet products. In the related art, browser performance is usually measured based on the loading speed of the browser. Therefore, this method of measuring browser performance is based on single running data.

SUMMARY

According to a first aspect of the present disclosure, a method for obtaining browser running data is provided. The method includes:

receiving a trigger request of event, in which the trigger request includes an event to be executed and a first time point corresponding to the trigger request;

in a case that the event to be executed is bound with a callback function, binding the event to be executed with a preset event monitoring function;

obtaining a second time point for executing the event monitoring function; and determining a response duration of a browser under the event to be executed based on a time interval between the second time point and the first time point.

According to a second aspect of the present disclosure, an electronic device is provided. The electronic device includes: at least one processor and a memory communicatively coupled to the at least one processor. The processor is configured to:

receive a trigger request of event, in which the trigger request includes an event to be executed and a first time point corresponding to the trigger request;

bind the event to be executed with a preset event monitoring function, in a case that the event to be executed is bound with a callback function;

obtain a second time point for executing the event monitoring function; and determine a response duration of a browser under the event to be executed based on a time interval between the second time point and the first time point.

According to a third aspect of the present disclosure, a non-transitory computer-readable storage medium having computer instructions stored thereon is provided. The computer instructions are configured to cause a computer to implement a method for obtaining browser running data, including:

receiving a trigger request of event, in which the trigger request includes an event to be executed and a first time point corresponding to the trigger request;

binding the event to be executed with a preset event monitoring function, in a case that the event to be executed is bound with a callback function;

obtaining a second time point for executing the event monitoring function; and determining a response duration of a browser under the event to be executed based on a time interval between the second time point and the first time point.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the present disclosure, in which.

DETAILED DESCRIPTION

Embodiments of the present disclosure are described below with reference to the accompanying drawings, including various details of the embodiments of the present disclosure to facilitate understanding, which shall be considered illustrative. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

A method and an apparatus for obtaining browser running data, an electronic device, and a storage medium of the embodiments of the present disclosure will be described in detail below with reference to the drawings.

Figure 1:
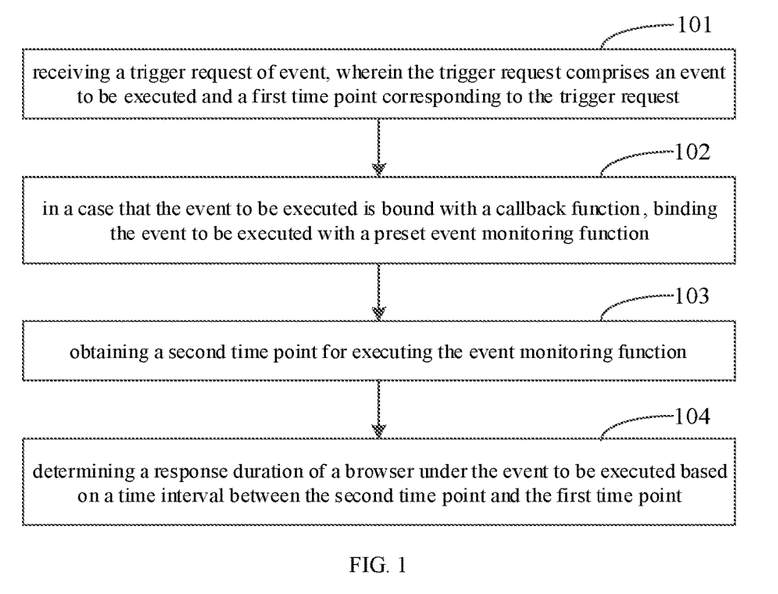
FIG. 1 is a flowchart of a method for obtaining browser running data according to an embodiment of the present disclosure.

FIG. 1 is a flowchart of a method for obtaining browser running data according to an embodiment of the present disclosure.

As illustrated in FIG. 1, the method includes the following steps.

In step 101, a trigger request of event is received, the trigger request includes an event to be executed and a first time point corresponding to the trigger request.

The event to be executed may be event triggered when the user operates on a browser page. For example, for Web applications, representative events include clicking, double-clicking, and moving the mouse. The first time point may be the time point when the request is triggered.

In the present disclosure, the browser client may trigger the event to be executed through keyboard entry, mouse click and other operations. Then, the browser client will obtain the timestamp of the trigger time point as the first time point corresponding to the trigger request, and determine the triggered event as the event to be executed.

For example, the "open" icon on an advertisement window of the browser page is clicked by the mouse to trigger the click event request corresponding to the "open" icon. When the browser client receives the request, the timestamp of this receiving time is determined as the first time point corresponding to the trigger request, and the click event is determined as the event to be executed.

In step 102, in a case that the event to be executed is bound with a callback function, the event to be executed is bound with a preset event monitoring function.

The callback function may be the program code corresponding to the event to be executed. Generally, different page events of the browser need to be bound with the corresponding callback function, and the page event can be completed by executing the callback function.

In addition, the preset event monitoring function may have the function of obtaining timestamps, to monitor the end time point of each callback function running in the browser. In the present disclosure, when it is determined that the event to be executed is bound with the callback function, the event can be bound with the preset event monitoring function, so as to obtain the execution end time point of each event.

In the present disclosure, the callback function corresponding to each page element may be determined by parsing the page script during the page loading process, and then the callback function may be bound by calling event binding with application programming interface (API). When the callback function has been bound, the event binding API may be called again to complete the binding of the event monitoring function and the event. Alternatively, when the event is triggered, the event binding API is called to complete the binding between the monitoring function and the event to be executed.

It can be understood that the event to be executed may be bound to multiple callback functions. The innermost bound callback function may be the callback function corresponding to the business function (hereinafter referred to as the business callback function), and the outermost bound callback function is the event monitoring function, which is used to obtain the end time point of the event to be executed.

In step 103, a second time point for executing the event monitoring function is obtained.

The second time point for executing the event monitoring function is the end time point of the business callback function. In the present disclosure, the end time point of each event can be obtained by using the event monitoring function.

In the present disclosure, when any event is triggered, the browser client may complete the event by executing the callback functions in turn according to the sequence of the callback functions bound to the event.

It should be noted that when the browser main thread is idle, after any event is triggered, each callback function may be executed immediately according to its corresponding callback function binding sequence. When the browser main thread executes other tasks, it is needed to add the event to be executed to the execution stack, so that each task can be executed in sequence according to the sequence of each task in the execution stack. When the event to be executed is executed, each callback function is executed in sequence according to its corresponding callback function binding sequence, so as to obtain the second time point for executing the event monitoring function.

Figure 2:
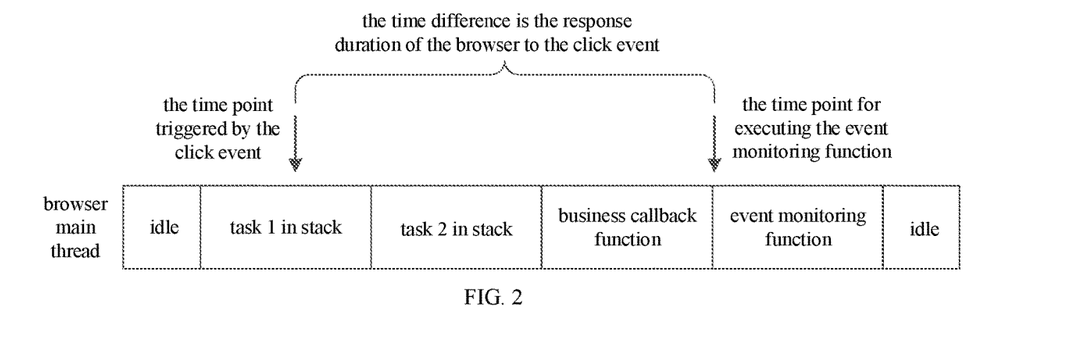
FIG. 2 is a schematic diagram of obtaining page running data according to an embodiment of the present disclosure.

For example, FIG. 2 is a schematic diagram of obtaining page running data according to the embodiment of the present disclosure. As illustrated in FIG. 2, when there are two tasks to be executed in the stack, when the click event occurs during the execution of task 1, the browser can complete the execution of task 1 first, then execute task 2 in the stack. Then, the business callback function bound with the click event is executed, and the event monitoring function is executed again to obtain the timestamp of the time point when the event monitoring function is executed, that is, the second time point.

In step 104, a response duration of a browser under the event to be executed is determined based on a time interval between the second time point and the first time point.

In the present disclosure, the time difference between the second time point and the first time point can be determined, and then the time difference is taken as the response duration of the browser under the event to be executed.

For example, as illustrated in FIG. 2, when the click event occurs during task 1 in the execution stack, the response duration of the browser to the click event can be the time difference between the trigger time point of the click event (i.e., the first time point) and the end time point of the execution of the business callback function. Since the time-consuming of the event detection function is short and negligible, the second time point when the event detection function is executed may be determined as the end time point of the execution of the business callback function. Therefore, the response duration of the browser to the click event can also be the time difference between the second time point and the first time point.

In the present disclosure, after receiving the trigger request of event, when it is determined that the event to be executed is bound with the callback function, the event to be executed is bound with the preset event monitoring function. After obtaining the second time point, the response duration of the browser under the event to be executed may be determined according to the time interval between the second time point and the first time point. Therefore, the accuracy of monitoring the execution duration of each page event is improved by binding the event to be executed with the event monitoring function, thereby improving the accuracy of browser performance monitoring. The number of browser monitoring scenes is increased by monitoring the event to be executed, so that the comprehensiveness of browser performance monitoring is enhanced.

Figure 3:
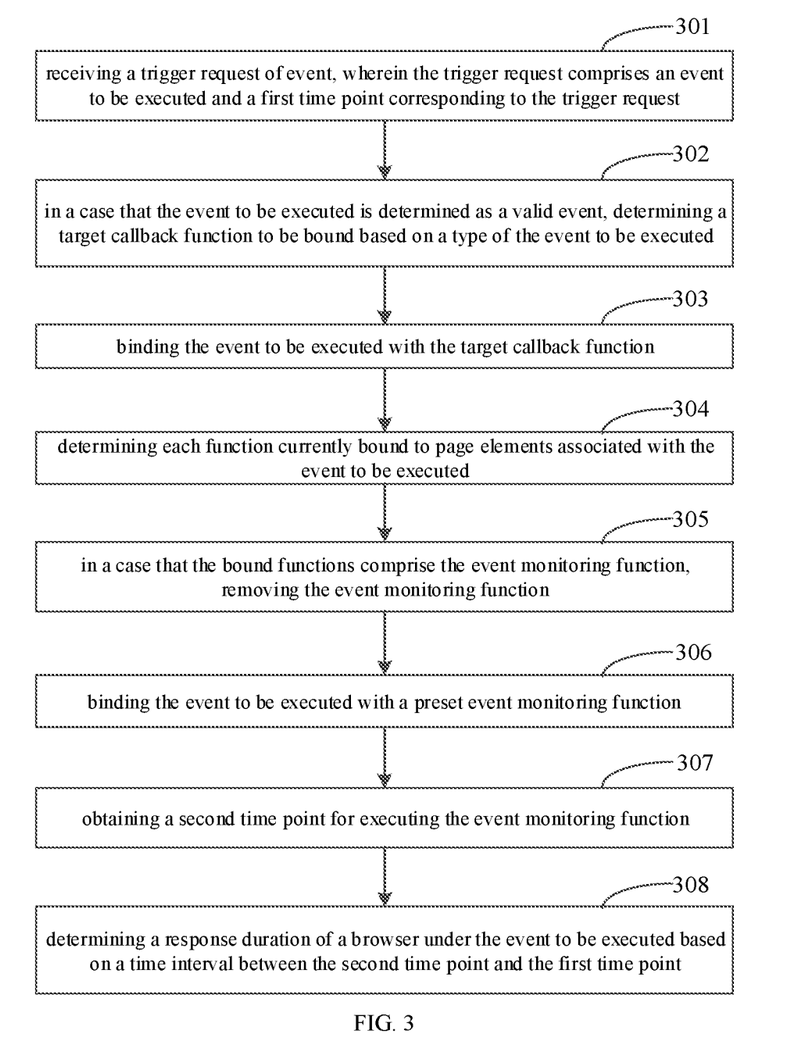
FIG. 3 is a flowchart of a method for obtaining browser running data according to another embodiment of the present disclosure.

In practical applications, there are usually many pages that use front-end elements to switch routes. The whole process is implemented in the same page without jumping among different pages. When the same page element can be triggered multiple times to trigger different events, if the event monitoring function registered for each event is not cleared, there may be a risk of memory leakage. Therefore, after binding an event to an event monitoring function, it is necessary to delete the event monitoring function. The above process will be described in detail below in combination with FIG. 3. FIG. 3 is a method for obtaining browser running data according to another embodiment of the present disclosure.

As illustrated in FIG. 3, the method includes the following steps.

In step 301, a trigger request of event is received, the trigger request includes an event to be executed and a first time point corresponding to the trigger request.

In the embodiment, the specific implementation process of step 301 can be referred to the detailed description of the above embodiment, and will not be repeated here.

In step 302, in a case that the event to be executed is determined as a valid event, a target callback function to be bound is determined based on a type of the event to be executed.

The valid event may be any event that can cause changes in page content. For example, after clicking the "login" icon in the page, the page pops up a verification window, then this click event is a valid event.

It can be understood that the callback functions corresponding to the same type of events may be the same. For example, the event of moving the mouse corresponding to all page elements may correspond to the callback functions used to restore the default settings. Alternatively, the callback functions corresponding to the same type of events may be different. For example, the event of clicking the "return" icon may correspond to the callback function used to close the window, and the event of clicking the "OK" icon may correspond to the callback function used to submit data. It should be noted that the above correspondences between the events and the callback functions are schematic description and cannot be used as a limitation on the technical solution in the present disclosure.

In the embodiment, whether each event corresponding to each page element is a valid event may be identified by annotation in the HyperText Markup Language (HTML) code file of the browser, and then during the loading of the browser page, the annotation information corresponding to the event may be parsed, to determine whether the event is a valid event. In a case that the event to be executed is a valid event, when the callback functions corresponding to the same type of event are the same, the target callback function may be determined according to the type of event to be executed. When the callback functions corresponding to the same type of event are different, the target callback function may be determined according to the functions of the page elements associated with the event to be executed, which is not limited in the present disclosure.

In the present disclosure, in a case that the event to be executed is determined as a valid event, the target callback function to be bound may be determined according to the type of the event to be executed, so as to meet the needs of various scenarios.

In step 303, the event to be executed is bound with the target callback function.

In the embodiment, the specific implementation process of step 303 can be referred to the detailed description of the above embodiment, and will not be repeated here.

In step 304, each function currently bound to page elements associated with the event to be executed is determined.

In practical applications, if the same page element can be triggered multiple times to generate different events, the page element may be registered with multiple event monitoring functions, resulting in memory leakage.

For example, there is an icon in the current page. When the icon is clicked at the first time, a pop-up window appears, and the icon function will change from "open" to "close". The click event corresponding to this icon is bound with the first event monitoring function. Then, when this icon is clicked again, the pop-up window will be closed, and the click event corresponding to this icon is bound with the second event monitoring function. As the number of clicking operations on this icon increases, the click event corresponding to this icon will be bound with more event monitoring functions. Therefore, the event monitoring functions that are bound to events can be deleted to prevent memory leak.

In step 305, in a case that the bound functions include the event monitoring function, the event monitoring function is removed.

In the embodiment, whether there is an event monitoring function involved in the function information bound to the page element may be determined by querying the information. If there is an event monitoring function, all the event monitoring functions registered to the page element can be deleted. For example, event unbinding API may be called to unbind the event monitoring function bound to the event.

For example, there is an icon in the current page. After clicking this icon for the first time, a pop-up window will open, and the button will change from "open" to "close". The click event corresponding to this button is bound to the event monitoring function for the first time. When clicking this icon again, the event unbinding API can be called to delete the event monitoring function bound to the click event for the first time.

In step 306, the event to be executed is bound with a preset event monitoring function.

In the present disclosure, when the event is a valid event, the user can directly detect the response speed of the browser to the event through a page change. When the event is an invalid event, the user cannot directly feel the response speed of the browser to the event. Therefore, valid events can be monitored pertinently.

In the present disclosure, when the event to be executed is a valid event, the event binding API can be called to complete the binding between the event monitoring function and the event to be executed.

In step 307, a second time point for executing the event monitoring function is obtained.

In step 308, a response duration of a browser under the event to be executed is determined based on a time interval between the second time point and the first time point.

In the embodiment, the specific implementation process from step 307 to step 308 can be referred to the detailed description of the above embodiment, and will not be repeated here.

In this present disclosure, after receiving the trigger request of event, the target callback function is determined according to the type of the event to be executed, and the event to be executed is bound with the callback function. Then, each function currently bound to the page element associated with the event to be executed is determined, and the bound event monitoring function is removed when the bound functions contain the event monitoring function, and the event to be executed is bound with the preset event monitoring function. Then, after obtaining the second time for executing the event monitoring function, the response duration of the browser under the event to be executed can be determined according to the time interval between the second time point and the first time point. Therefore, by deleting the event monitoring function bound to the page element associated with the event to be executed, the memory leakage caused by registering too many event monitoring functions can be prevented, which improves the stability of program operation and provides conditions for comprehensive and accurate monitoring of browser performance.

Figure 4:
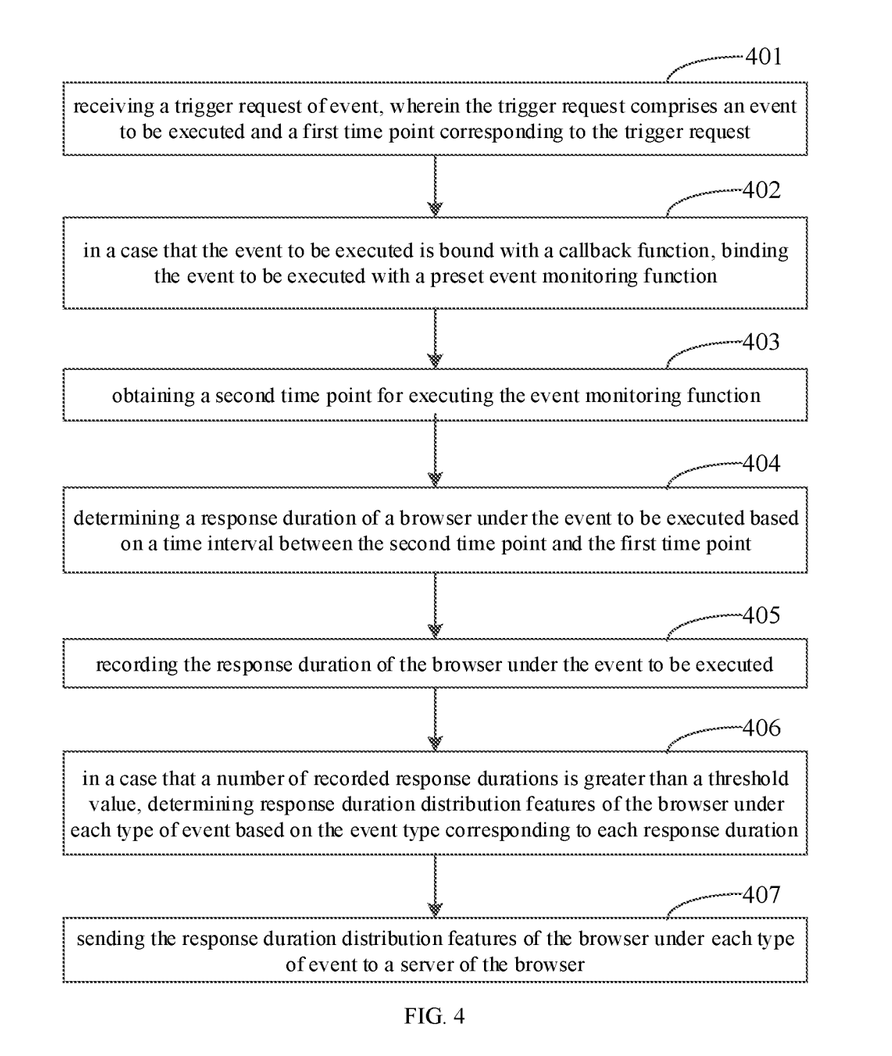
FIG. 4 is a flowchart of a method for obtaining browser running data according to yet another embodiment of the present disclosure.

In practical applications, if the browser client records the obtained response duration of each event, a large amount of response duration data may be cached. However, the browser cache space is limited. When a large amount of data is stored, the browser performance may be degraded. Therefore, each client can regularly upload the monitoring data to the browser server, which can reduce the data cache pressure on the client side, and enable the server to make unified statistics and analysis on the performance of the browser according to the data returned by each client. The above process will be described in detail below in combination with FIG. 4, FIG. 4 is a flowchart of a method for obtaining browser running data according to yet another embodiment of the present disclosure.

In step 401, a trigger request of event is received, the trigger request includes an event to be executed and a first time point corresponding to the trigger request.

In step 402, in a case that the event to be executed is bound with a callback function, the event to be executed is bound with a preset event monitoring function.

In step 403, a second time point for executing the event monitoring function is obtained.

In step 404, a response duration of a browser under the event to be executed is determined based on a time interval between the second time point and the first time point.

In the embodiment, the specific implementation process from step 401 to step 404 can be referred to the detailed description of any embodiment of the present disclosure, and will not be repeated here.

In step 405, the response duration of the browser under the event to be executed is recorded.

In the embodiment, after determining the response duration of the browser under the event to be executed, the response duration may be written to a log file in any format.

The record format may record an event name and the corresponding response duration for each line, and may also take the event name and the corresponding duration as a unit separated by semicolons. Log files may be created automatically when the browser starts running, or when the first response duration data is detected.

In step 406, in a case that a number of recorded response durations is greater than a threshold value, response duration distribution features of the browser under each type of event are determined based on the event type corresponding to each response duration.

In the present disclosure, the browser client will record a large amount of response duration data. However, when analyzing the browser performance, it is only needed to pay attention to the response duration distribution features of each type of event, not to each piece of response duration data. Therefore, the browser client can first determine the response duration distribution features corresponding to each type of event according to the event types corresponding to each recorded response duration, and then upload the response duration distribution features, so as to reduce the amount of uploaded data and shorten the time of uploading data.

In the embodiment, the browser client can monitor the size of the log file storing the response duration in real time, or automatically update the number of recorded response durations each time data that is written to the log file. When the log file is greater than a preset threshold, the data in the log file will be classified according to the event type, and the response duration data of various events will be counted to determine the response duration distribution features of various events.

The response duration distribution features include feature data, such as a response duration mean value, a response duration quantile value, a response duration extreme value, and a response duration sampling value. Therefore, according to a variety of response duration distribution features, the browser performance can be analyzed more comprehensively and accurately.

In step 407, the response duration distribution features of the browser under each type of event are sent to a server of the browser.

In the present disclosure, each browser client may clear the log file storing the response duration after sending the response duration distribution features of various events recorded to the browser server. After receiving the response duration distribution features, the browser server can write it to the log file for browser performance analysis.

Optionally, the attribute information of the terminal device where the browser client is currently located to the browser server, so that the browser server can determine the response conditions to the same event on different terminal devices according to the attribute information of the terminal device where the browser client is located.

In the present disclosure, after receiving the trigger request of event, the event to be executed is bound with the preset event monitoring function when it is determined that the event to be executed is bound with the callback function. Then, after obtaining the second time for executing the event monitoring function, the response duration of the browser under the event to be executed can be determined according to the time interval between the second time point and the first time point. Then, according to the event type corresponding to each response duration, the response duration distribution features of the browser under each type of event are determined, and the response duration distribution features are sent to the browser server. Therefore, by sending the response duration distribution features of the browser under each type of event to the browser server, it is helpful for the server to make unified statistics and analysis on the performance of the browser according to the data returned by each client, so as to improve the usability of performance analysis of the browser.

Figure 5:
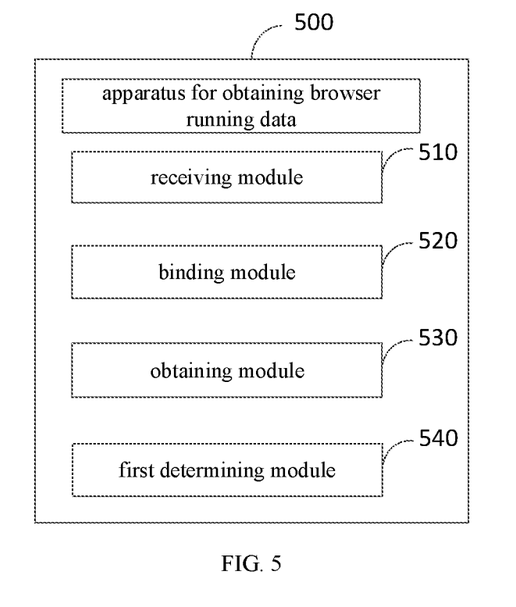
FIG. 5 is a schematic diagram of an apparatus for obtaining browser running data according to an embodiment of the present disclosure.

In order to realize the above embodiments, the embodiments of the present disclosure also provide an apparatus for obtaining browser running data. FIG. 5 is a schematic diagram of an apparatus for obtaining browser running data according to an embodiment of the present disclosure.

As illustrated in FIG. 5, the apparatus for obtaining browser running data 500 includes: a receiving module 510, a binding module 520, an obtaining module 530 and a first determining module 540.

The receiving module 510 is configured to receive a trigger request of event, in which the trigger request includes an event to be executed and a first time point corresponding to the trigger request.

The binding module 520 is configured to, in a case that the event to be executed is bound with a callback function, bind the event to be executed with a preset event monitoring function.

The obtaining module 530 is configured to obtain a second time point for executing the event monitoring function.

The first determining module 540 is configured to determine a response duration of a browser under the event to be executed based on a time interval between the second time point and the first time.

In a possible implementation, the binding module is further configured to: in a case that the event to be executed is determined as a valid event, determine a target callback function to be bound based on a type of the event to be executed; and bind the event to be executed with the target callback function.

In a possible implementation, the apparatus further includes: a recording module, a second determining module and a sending module.

The recording module is configured to record the response duration of the browser under the event to be executed.

The second determining module is configured to, in a case that a number of recorded response durations is greater than a threshold value, determine response duration distribution features of the browser under each type of event based on the event type corresponding to each response duration.

The sending module is configured to send the response duration distribution features of the browser under each type of event to a server of the browser.

In a possible implementation, the sending module is further configured to send attribute information of a terminal device where a client of the browser is currently located to the server of the browser.

In a possible implementation, the response duration distribution features include at least one of: a response duration mean value, a response duration quantile value, a response duration extreme value, and a response duration sampling value.

In a possible implementation, the binding module is further configured to: determine each function currently bound to page elements associated with the event to be executed; and in a case that the bound functions include the event monitoring function, remove the event monitoring function.

It should be noted that the above explanation of the embodiments of the method for obtaining browser running data is also applicable to the apparatus of this embodiment, which will not be repeated here.

In the present disclosure, after receiving the trigger request of event, the event to be executed is bound with the preset event monitoring function when it is determined that the event to be executed is bound with the callback function. After obtaining the second time point for executing the event monitoring function, the response duration of the browser under the event to be executed can be determined based on the time interval between the second time and the first time. Therefore, the accuracy of monitoring the execution duration of each page event is improved by binding the event to be executed with the event monitoring function, thereby improving the accuracy of browser performance monitoring. The number of browser monitoring scenes is increased by monitoring the event to be executed, so that the comprehensiveness of browser performance monitoring is enhanced.

According to the embodiments of the present disclosure, the present disclosure also provides an electronic device, a readable storage medium and a computer program product.

Figure 6:
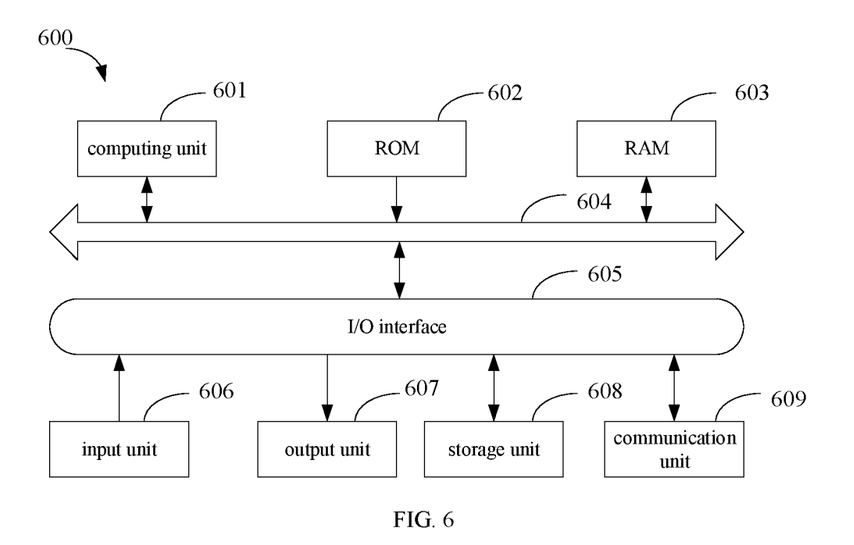
FIG. 6 is a block diagram of an electronic device for implementing a method for obtaining browser running data according to an embodiment of the present disclosure.

FIG. 6 is a block diagram of an example electronic device 600 used to implement the embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the present disclosure described and/or required herein.

As illustrated in FIG. 6, the device 600 includes a computing unit 601 performing various appropriate actions and processes based on computer programs stored in a read-only memory (ROM) 602 or computer programs loaded from the storage unit 608 to a random access memory (RAM) 603. In the RAM 603, various programs and data required for the operation of the device 600 are stored. The computing unit 601, the ROM 602, and the RAM 603 are connected to each other through a bus 604. An input/output (I/O) interface 605 is also connected to the bus 604.

Components in the device 600 are connected to the I/O interface 605, including: an inputting unit 606, such as a keyboard, a mouse; an outputting unit 607, such as various types of displays, speakers; a storage unit 608, such as a disk, an optical disk; and a communication unit 609, such as network cards, modems, and wireless communication transceivers. The communication unit 609 allows the device 600 to exchange information/data with other devices through a computer network such as the Internet and/or various telecommunication networks.

The computing unit 601 may be various general-purpose and/or dedicated processing components with processing and computing capabilities. Some examples of computing unit 601 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 601 executes the various methods and processes described above, such as the method for obtaining browser running data. For example, in some embodiments, the method may be implemented as a computer software program, which is tangibly contained in a machine-readable medium, such as the storage unit 608. In some embodiments, part or all of the computer program may be loaded and/or installed on the device 600 via the ROM 602 and/or the communication unit 609. When the computer program is loaded on the RAM 603 and executed by the computing unit 601, one or more steps of the method described above may be executed. Alternatively, in other embodiments, the computing unit 601 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the defects of difficult management and weak business scalability in the traditional physical host and virtual private server (VPS) service. The server can also be a server of distributed system or a server combined with block-chain.

According to the embodiments of the present disclosure, the present disclosure provides a computer program product including computer programs is provided. When the computer programs are executed by a processor, the method for obtaining browser running data provided by the embodiments of the present disclosure is implemented.

It should be understood that the various forms of processes shown above can be used to reorder, add or delete steps. For example, the steps described in the present disclosure could be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for obtaining browser running data, comprising:
   receiving a trigger request of an event, wherein the trigger request comprises an event to be executed and a first time point corresponding to the trigger request;
   binding the event to be executed with a preset event monitoring function, in a case that the event to be executed is bound with a callback function;
   obtaining a second time point for executing the event monitoring function; and
   determining a response duration of a browser under the event to be executed based on a time interval between the second time point and the first time point.

2. The method of claim 1, wherein binding the event to be executed with the callback function, comprises:
   in a case that the event to be executed is determined as a valid event, determining a target callback function to be bound based on a type of the event to be executed; and
   binding the event to be executed with the target callback function.

3. The method of claim 1, wherein after determining the response duration of the browser under the event to be executed, the method further comprises:
   recording the response duration of the browser under the event to be executed;
   in a case that a number of recorded response durations is greater than a threshold value, determining response duration distribution features of the browser under each type of event based on the event type corresponding to each response duration; and
   sending the response duration distribution features of the browser under each type of event to a server of the browser.

4. The method of claim 3, wherein the response duration of the browser is recorded in a log file in any format, and recording the response duration of the browser under the event to be executed, comprises:
   monitoring the size of the log file in real time, or updating the number of recorded response durations each time data is written to the log file.

5. The method of claim 4, wherein determining the response duration distribution features of the browser under each type of event based on the event type corresponding to each response duration, comprises:
classifying the data in the log file according to the event type, and counting the response duration data of each type of event to determine the response duration distribution features.

6. The method of claim 3, further comprising:
sending attribute information of a terminal device where a client of the browser is currently located to the server of the browser.

7. The method of claim 3, wherein the response duration distribution features comprise at least one of: a response duration mean value, a response duration quantile value, a response duration extreme value, and a response duration sampling value.

8. The method of claim 1, wherein before binding the event to be executed with the preset event monitoring function, the method further comprises:
determining each function currently bound to page elements associated with the event to be executed; and
in a case that the bound functions comprise the event monitoring function, removing the event monitoring function.

9. The method of claim 1, wherein the event to be executed is bound with multiple callback functions, in which the innermost bound callback function is a business callback function, and the outermost bound callback function is the event monitoring function.

10. The method of claim 9, wherein obtaining the second time point for executing the event monitoring function, comprises:
executing each callback function in sequence according to a sequence of the callback functions bound to the event, to obtain the second time point for executing the event monitoring function.

11. An electronic device, comprising:
at least one processor; and
a memory communicatively coupled to the at least one processor; wherein, the processor is configured to:
receive a trigger request of an event, wherein the trigger request comprises an event to be executed and a first time point corresponding to the trigger request;
bind the event to be executed with a preset event monitoring function, in a case that the event to be executed is bound with a callback function;
obtain a second time point for executing the event monitoring function; and
determine a response duration of a browser under the event to be executed based on a time interval between the second time point and the first time point.

12. The device of claim 11, wherein the processor is further configured to:
determine a target callback function to be bound based on a type of the event to be executed, in a case that the event to be executed is determined as a valid event; and
bind the event to be executed with the target callback function.

13. The device of claim 11, wherein after determining the response duration of the browser under the event to be executed, the processor is further configured to:
record the response duration of the browser under the event to be executed;
in a case that a number of recorded response durations is greater than a threshold value, determine response duration distribution features of the browser under each type of event based on the event type corresponding to each response duration; and
send the response duration distribution features of the browser under each type of event to a server of the browser.

14. The device of claim 13, wherein the response duration of the browser is recorded in a log file in any format, and the processor is further configured to:
monitor the size of the log file in real time, or update the number of recorded response durations each time data is written to the log file.

15. The device of claim 14, wherein the processor is further configured to:
classify the data in the log file according to the event type, and count the response duration data of each type of event to determine the response duration distribution features.

16. The device of claim 13, the processor is further configured to:
send attribute information of a terminal device where a client of the browser is currently located to the server of the browser.

17. The device of claim 13, wherein the response duration distribution features comprise at least one of: a response duration mean value, a response duration quantile value, a response duration extreme value, and a response duration sampling value.

18. The device of claim 11, wherein before binding the event to be executed with the preset event monitoring function, the processor is further configured to:
determine each function currently bound to page elements associated with the event to be executed; and
in a case that the bound functions comprise the event monitoring function, remove the event monitoring function.

19. The device of claim 11, wherein the event to be executed is bound with multiple callback functions, in which the innermost bound callback function is a business callback function, and the outermost bound callback function is the event monitoring function, and the processor is further configured to:
execute each callback function in sequence according to a sequence of the callback functions bound to the event, to obtain the second time point for executing the event monitoring function.

20. A non-transitory computer-readable storage medium having computer instructions stored thereon, wherein the computer instructions are configured to cause a computer to execute a method for obtaining browser running data, comprising:
receiving a trigger request of an event, wherein the trigger request comprises an event to be executed and a first time point corresponding to the trigger request;
binding the event to be executed with a preset event monitoring function, in a case that the event to be executed is bound with a callback function;
obtaining a second time point for executing the event monitoring function; and
determining a response duration of a browser under the event to be executed based on a time interval between the second time point and the first time point.

* * * * *